United States Patent
Chen et al.

(10) Patent No.: US 10,462,225 B2
(45) Date of Patent: Oct. 29, 2019

(54) METHOD AND SYSTEM FOR AUTONOMOUSLY INTERFACING A VEHICLE ELECTRICAL SYSTEM OF A LEGACY VEHICLE TO AN INTELLIGENT TRANSPORTATION SYSTEM AND VEHICLE DIAGNOSTIC RESOURCES

(71) Applicant: Innova Electronics Corporation, Irvine, CA (US)

(72) Inventors: Ieon C. Chen, Laguna Hills, CA (US); David Rich, Huntington Beach, CA (US)

(73) Assignee: INNOVA ELECTRONICS CORPORATION, Irvine, CA (US)

( * ) Notice: Subject to any disclaimer, the term of this patent is extended or adjusted under 35 U.S.C. 154(b) by 49 days.

(21) Appl. No.: 15/687,328

(22) Filed: Aug. 25, 2017

(65) Prior Publication Data

US 2019/0068712 A1  Feb. 28, 2019

(51) Int. Cl.
| | | |
|---|---|---|
| *H04L 29/08* | (2006.01) | |
| *G07C 5/00* | (2006.01) | |
| *G07C 5/08* | (2006.01) | |
| *B60T 7/16* | (2006.01) | |

(52) U.S. Cl.
CPC .............. *H04L 67/12* (2013.01); *G07C 5/008* (2013.01); *G07C 5/0808* (2013.01); *G07C 5/0825* (2013.01); *B60T 7/16* (2013.01)

(58) Field of Classification Search
CPC ......... B60T 7/16; G07C 5/008; G07C 5/0808; G07C 5/0825; H04L 67/12
USPC ............................................................. 701/2
See application file for complete search history.

(56) References Cited

U.S. PATENT DOCUMENTS

| D334,560 S | 4/1993 | Wilson |
| 5,347,211 A | 9/1994 | Jakubowski |
| D377,622 S | 1/1997 | Chen |
| 5,635,841 A | 6/1997 | Taylor |
| 5,758,300 A | 5/1998 | Abe |
| 5,767,681 A | 6/1998 | Huang |

(Continued)

FOREIGN PATENT DOCUMENTS

WO      WO 0186576      11/2001

OTHER PUBLICATIONS

Babcox Media, Inc., Telematics Talk WEX Awarded Homeland Security Purchase Agreement for Telematics Products and Services, Aug. 25, 2017.

(Continued)

*Primary Examiner* — Atul Trivedi
(74) *Attorney, Agent, or Firm* — Stetina Brunda Garred and Brucker; Mark B. Garred

(57) ABSTRACT

A vehicle communication device that is engageable to a vehicle, e.g., by a vehicle license plate fastener and/or within an OBD communication device, for interfacing a vehicle electrical system to a V2X data stream. A micro computing unit (MCU) is disposed within the device, defining a processor and a memory. The MCU is configured to derive information from the V2X data stream. An antenna circuit is disposed within the housing, in communication with the MCU, and configured to receive and communicate the V2X data stream to the MCU. A vehicle electrical system connecting circuit is also provided for communicating the information derived from the V2X data stream to the vehicle electrical system.

37 Claims, 4 Drawing Sheets

(56) References Cited

U.S. PATENT DOCUMENTS

| | | |
|---|---|---|
| 5,809,437 A | 9/1998 | Breed |
| 5,859,628 A | 1/1999 | Ross et al. |
| 5,884,202 A | 3/1999 | Arjomand |
| 6,000,413 A | 12/1999 | Chen |
| 6,055,468 A | 4/2000 | Kaman et al. |
| 6,094,609 A | 7/2000 | Arjomand |
| 6,169,943 B1 | 1/2001 | Simon et al. |
| 6,225,898 B1 | 5/2001 | Kamiya et al. |
| 6,263,268 B1 | 7/2001 | Nathanson |
| 6,389,337 B1 | 5/2002 | Kolls |
| 6,438,471 B1 | 8/2002 | Katagishi et al. |
| 6,499,385 B2 | 12/2002 | Protti |
| 6,535,112 B1 | 3/2003 | Rothshink |
| 6,587,768 B2 | 7/2003 | Chene et al. |
| 6,611,740 B2 | 8/2003 | Lowrey et al. |
| 6,650,318 B1 | 11/2003 | Arnon |
| 6,718,425 B1 | 4/2004 | Pajakowski et al. |
| 6,732,031 B1 | 5/2004 | Lightner et al. |
| 6,807,469 B2 | 10/2004 | Funkhouser et al. |
| 6,836,708 B2 | 12/2004 | Tripathi |
| 6,847,916 B1 | 1/2005 | Ying |
| 6,868,369 B2 | 3/2005 | Huang |
| 6,925,368 B2 | 8/2005 | Funkhouser et al. |
| 6,940,270 B2 | 9/2005 | Chen |
| D510,287 S | 10/2005 | Chen |
| 6,957,133 B1 | 10/2005 | Hunt et al. |
| 6,968,733 B2 | 11/2005 | Andreasen |
| 7,030,742 B2 | 4/2006 | Treadway |
| 7,085,680 B2 | 8/2006 | Huang |
| 7,116,216 B2 | 10/2006 | Andreasen |
| 7,209,813 B2 | 4/2007 | Namaky |
| RE39,619 E | 5/2007 | Andreasen |
| D545,223 S | 6/2007 | Chen |
| D559,137 S | 1/2008 | Protti |
| D560,129 S | 1/2008 | Rich |
| D560,527 S | 1/2008 | Rich |
| 7,325,775 B2 | 2/2008 | Chen |
| D563,249 S | 3/2008 | Chen |
| 7,363,149 B2 | 4/2008 | Klausner et al. |
| D569,280 S | 5/2008 | Chen |
| 7,376,497 B2 | 5/2008 | Chen |
| D571,241 S | 6/2008 | Andreasen |
| 7,437,227 B2 | 10/2008 | Andreasen |
| D581,822 S | 12/2008 | Madison |
| 7,464,000 B2 | 12/2008 | Huang |
| D588,621 S | 3/2009 | Baty |
| D590,387 S | 4/2009 | Chen |
| 7,520,668 B2 | 4/2009 | Chen |
| RE40,798 E | 6/2009 | Chen |
| RE40,799 E | 6/2009 | Chen |
| 7,603,293 B2 | 10/2009 | Chen |
| 7,620,484 B1 | 11/2009 | Chen |
| D610,586 S | 2/2010 | Chen |
| 7,734,390 B2 | 6/2010 | Chen |
| 7,778,750 B2 | 8/2010 | Knight et al. |
| D624,446 S | 9/2010 | Chen |
| D624,838 S | 10/2010 | Chen |
| D625,209 S | 10/2010 | Chen |
| D625,210 S | 10/2010 | Chen |
| D625,634 S | 10/2010 | Chen |
| 7,904,219 B1 | 3/2011 | Lowrey et al. |
| 7,974,750 B2 | 7/2011 | Namaky |
| 8,019,503 B2 | 9/2011 | Andreasen |
| 8,024,083 B2 | 9/2011 | Chen |
| D646,188 S | 10/2011 | Chen |
| D646,599 S | 10/2011 | Chen |
| 8,032,419 B2 | 10/2011 | Chen |
| 8,068,951 B2 | 11/2011 | Chen et al. |
| 8,301,329 B2 | 10/2012 | Andreasen |
| 8,306,687 B2 | 11/2012 | Chen |
| 8,370,018 B2 | 2/2013 | Andreasen et al. |
| 8,509,986 B1 | 8/2013 | Chen |
| 8,630,765 B2 | 1/2014 | Chen |
| 8,825,270 B2 | 9/2014 | Chen |
| 8,825,271 B2 | 9/2014 | Chen |
| 8,831,814 B2 | 9/2014 | Chen |
| 8,855,621 B2 | 10/2014 | Chen |
| 8,862,117 B2 | 10/2014 | Chen |
| 8,880,274 B2 | 11/2014 | Chen |
| 8,892,271 B2* | 11/2014 | Breed ............... G08G 1/161 701/2 |
| 8,909,416 B2 | 12/2014 | Chen et al. |
| 8,930,041 B1 | 1/2015 | Grimm et al. |
| 9,002,554 B2 | 4/2015 | Chen |
| 9,014,908 B2 | 4/2015 | Chen |
| 9,026,400 B2 | 5/2015 | Chen et al. |
| 9,117,319 B2 | 8/2015 | Chen et al. |
| 9,123,051 B2 | 9/2015 | Chen |
| 9,141,503 B1 | 9/2015 | Chen |
| 9,142,066 B2 | 9/2015 | Chen et al. |
| 9,177,428 B2 | 11/2015 | Nguyen et al. |
| 9,213,447 B2 | 12/2015 | Chen |
| 9,324,194 B2 | 4/2016 | Pham |
| 9,342,934 B2 | 5/2016 | Chen |
| 9,384,599 B2 | 7/2016 | Chen et al. |
| 9,430,883 B2 | 8/2016 | Busse et al. |
| 9,494,125 B2 | 11/2016 | Pham et al. |
| 9,646,427 B2 | 5/2017 | Chen et al. |
| 9,646,432 B2 | 5/2017 | Madison et al. |
| 9,761,062 B2 | 9/2017 | Chen |
| 9,761,066 B2 | 9/2017 | Chen et al. |
| 2003/0171111 A1 | 9/2003 | Clark |
| 2004/0110472 A1 | 6/2004 | Witkowski |
| 2005/0273218 A1* | 12/2005 | Breed ............... B60C 11/24 701/2 |
| 2007/0038338 A1* | 2/2007 | Larschan ............ G07C 5/008 701/2 |
| 2009/0248222 A1* | 10/2009 | McGarry ............ G08G 1/052 701/2 |
| 2012/0212499 A1* | 8/2012 | Haddick ........... G02B 27/0093 345/589 |
| 2013/0127980 A1* | 5/2013 | Haddick ............ G06F 3/013 348/14.08 |
| 2013/0201316 A1* | 8/2013 | Binder ............... H04L 67/12 348/77 |
| 2014/0032014 A1* | 1/2014 | DeBiasio ........... H04B 1/082 701/2 |
| 2014/0046508 A1* | 2/2014 | Himmelstein ...... G06Q 10/10 701/2 |
| 2014/0046800 A1 | 2/2014 | Chen |
| 2014/0297097 A1 | 10/2014 | Hurwitz |
| 2015/0045993 A1* | 2/2015 | Cooper ............ B61L 15/0027 701/2 |
| 2015/0206357 A1* | 7/2015 | Chen ............... G06F 16/243 701/31.4 |
| 2015/0346718 A1* | 12/2015 | Stenneth ......... G06Q 30/0611 701/2 |
| 2016/0027223 A1 | 1/2016 | Madison et al. |
| 2016/0046373 A1* | 2/2016 | Kugelmass ......... G05D 1/101 701/8 |
| 2016/0114745 A1* | 4/2016 | Ricci ............... H04W 12/06 701/2 |
| 2016/0147223 A1* | 5/2016 | Edwards ........... G05D 1/0027 701/2 |
| 2016/0188195 A1 | 6/2016 | Chen |
| 2016/0194014 A1* | 7/2016 | Rajendran ........ B61L 27/0005 701/2 |
| 2017/0048080 A1 | 2/2017 | Grimm et al. |
| 2017/0110012 A1 | 4/2017 | Lewis et al. |
| 2017/0122841 A1 | 5/2017 | Dudar et al. |
| 2017/0267192 A1* | 9/2017 | Chen .............. B60R 16/0234 |
| 2018/0137693 A1* | 5/2018 | Raman ............. G07C 5/008 |

OTHER PUBLICATIONS

SAE International, Surface Vehicle Standard J2735, Dedicated Short Range Communications (DSRC) Message Set Dictionary, Mar. 2016, 267 pages, www.sae.org.

SAE International, Surface Vehicle Standard J2945/1, On-Board System Requirements for V2V Safety Communications, Mar. 2016, 127 pages, www.sae.org.

(56) References Cited

OTHER PUBLICATIONS

U.S. Department of Transportation-National Highway Traffic Safety Administration (Daniel C. Smith) Federal Motor Vehicle Safety Standards: Vehicle-to-Vehicle (V2V) Communications, Aug. 20, 2014, 9 pages, Federal Register vol. 79, No. 161, Washington, D.C.
U.S. Department of Transportation-National Highway Traffic Safety Administration, NHTSA Issues Notice of Proposed Rulemaking and Research Report on Vehicle-to-Vehicle Communications, Vehicle-to-Vehicle Communication Technology, Dec. 13, 2016, 4 pages, vol. 1, https://icsw.nhtsa.gov/safercar/v2v/pdf/V2V_NPRM_Fact_Sheet_121316_v1.pdf.
SAE International, SAE Vehicle Interface Methodology Standard Proposal—Status Report Dec. 2015 SC31 Meeting in Auburn Hills, MI, Sep. 22, 2016, 11 pages, www.sae.org.

\* cited by examiner

METHOD AND SYSTEM FOR AUTONOMOUSLY INTERFACING A VEHICLE ELECTRICAL SYSTEM OF A LEGACY VEHICLE TO AN INTELLIGENT TRANSPORTATION SYSTEM AND VEHICLE DIAGNOSTIC RESOURCES

CROSS-REFERENCE TO RELATED APPLICATIONS

Not Applicable

STATEMENT RE: FEDERALLY SPONSORED RESEARCH/DEVELOPMENT

Not Applicable

BACKGROUND

The present invention relates to autonomous vehicle systems and, more particularly, to devices and systems for enabling autonomous vehicles to communicate with legacy vehicles, to allow legacy vehicles to receive and respond to informational content from other autonomous vehicle data stream messaging and the Intelligent Transportation System (ITS).

An autonomous car or other autonomous vehicle (also known as a driverless car, auto, self-driving car, robotic car) is a vehicle that is capable of sensing its environment and navigating without human input. Many such vehicles are being developed, but currently few, if any, automated cars permitted on public roads are fully autonomous, and may require a human driver at the wheel who is ready at a moment's notice to take control of the vehicle.

Autonomous cars use a variety of techniques to detect their surroundings, such as radar, laser light, GPS, odometry, and computer vision. Advanced control systems interpret sensory information to identify appropriate navigation paths, as well as obstacles and relevant signage. Autonomous cars have control systems that are capable of analyzing sensory data to distinguish between different cars on the road, which is very useful in planning a path to the desired destination.

"Autonomous" generally means having the power for self-governance. Autonomous control implies good performance under significant uncertainties in the environment for extended periods of time and the ability to compensate for system failures without external intervention.

It is often suggested to enhance the capabilities of an autonomous car by implementing communication networks both in the immediate vicinity (for collision avoidance) and far away (for congestion management). By bringing in these outside influences in the decision process, some would no longer regard the car's behavior or capabilities as "autonomous". In some context, "automated" connotes control or operation by a machine, while 'autonomous' connotes acting alone or independently. For purposes, of the present invention, as described below, the terms "autonomous" or "self-driving" are interpreted consistently, and to include "automated" vehicle systems. However, the latter term is "autonomous" is still considered accurate. Also, the terms "cars", "vehicles" and "automobiles" are intended to include any transportation industry vehicle, using any power system, e.g., gasoline, electric, compressed natural gas, fuel cell, etc.

Modern self-driving cars generally use Bayesian Simultaneous Localization and Mapping (SLAM) algorithms, which fuse data from multiple sensors and an off-line map into current location estimates and map updates. SLAM with detection and tracking of other moving objects (DATMO), which also handles things such as cars and pedestrians, is a variant developed by research at Google Inc. Simpler systems may use roadside real-time locating system (RTLS) beacon systems to aid localisation. Typical car sensors include LIDAR, stereo vision, GPS and inertial measuring unit (IMU) sensors. Visual object recognition uses machine vision including neural networks. Educator Udacity is understood to have developed an open-source software stack.

Among the anticipated benefits of autonomous cars, and the intelligent transportation system (ITS) in which they participate, is the potential reduction in traffic collisions (and resulting deaths and injuries and costs), caused by human-driver errors, such as delayed reaction time, tailgating, rubbernecking, and other forms of distracted or aggressive driving. Consulting firm McKinsey & Company, Inc. is reported to have estimated that widespread use of autonomous vehicles could "eliminate 90% of all auto accidents in the United States, prevent up to US $190 billion in damages and health-costs annually and save thousands of lives".

Autonomous cars are also predicted to offer major increases in traffic flow; enhance mobility for children, the elderly, disabled and poor people; lower fuel consumption; reduce the need for insurance; reduce the need for parking space in cities; a reduce vehicle associated crime; and the facilitate different business models for mobility as a service, especially for those involved in the sharing economy.

If a human driver isn't required, autonomous vehicles could also reduce labor costs; relieve travelers from driving and navigation chores, thereby replacing behind-the-wheel commuting hours with more time for leisure or work; and also would lift constraints relating to an occupants' ability to drive. As such there would be fewer incidents of drivers being distracted or texting while driving, intoxicated, prone to seizures, or otherwise impaired. For the young, the elderly, people with disabilities, and low-income citizens, autonomous vehicles could provide enhanced mobility.

Additional reported advantages associated with autonomous vehicle, could include higher speed limits; smoother rides; and increased roadway capacity; and reduced traffic congestion, due to decreased need for safety gaps and higher speeds. For example, currently, maximum controlled-access highway throughput or capacity according to the U.S. Highway Capacity Manual is reported to be about 2,200 passenger vehicles per hour per lane, with about 5% of the available road space is taken up by cars. According to a study by researchers at Columbia University, autonomous cars could increase capacity by 273% (approximately 8,200 cars per hour per lane). The study also estimated that with 100% connected vehicles using vehicle-to-vehicle communication, capacity could reach 12,000 passenger vehicles per hour (up 445% from 2,200 passenger vehicles/lane/hour) traveling safely at 120 km/h (75 mph) with a following gap of about 6 m (20 ft.) of each other. Currently, at highway speeds drivers keep between 40 to 50 m (130 to 160 ft.) away from the car in front. These increases in highway capacity could have a significant impact in traffic congestion, particularly in urban areas, and even effectively end highway congestion in some places.

As such, autonomous vehicles are expected to provide an improved ability to manage traffic flow, combined with less need for traffic police, less vehicle insurance, and even less road signage, since automated cars could receive necessary communication electronically (although roadway signage would still be needed for any human drivers on the road). Further, reduced traffic congestion and the improvements in traffic flow due to widespread use of autonomous vehicles are expected to also translate into better fuel efficiency.

Widespread adoption of autonomous cars could also reduce the needs of road and parking space in urban areas, freeing scarce land for other uses such as parks, public spaces, retail outlets, housing, and other social uses. Some believe that autonomous vehicles could also contribute, along with automated mass transit, to make dense cities much more efficient and livable.

The increased awareness of autonomous vehicles could reduce car theft, while the removal of the steering wheel—along with the remaining driver interface and the requirement for any occupant to assume a forward-facing position—could give the interior of the cabin greater ergonomic flexibility. Large vehicles, such as motorhomes, could attain appreciably enhanced ease of use.

When used for car sharing, the total number of cars on the roads likely to be further reduced. Furthermore, new business models (such as mobility as a service) may develop, which aim to be cheaper than car ownership by removing the cost of the driver. Finally, the robotic car could drive unoccupied to wherever it is required, such as to pick up passengers or to go in for maintenance (eliminating redundant passengers).

Individual autonomous vehicles may benefit from information obtained from not only their own information system, but also from information systems with other vehicles in the vicinity, especially information relating to traffic congestion and safety hazards. Vehicular communication systems may use other vehicles and roadside units as the communicating nodes in a peer-to-peer network, providing each other with information. As a cooperative approach, vehicular communication systems can allow all cooperating vehicles to be more effective. According to a 2010 study by the National Highway Traffic Safety Administration, vehicular communication systems could help avoid up to 79 percent of all traffic accidents. Among connected cars, an unconnected one may be the weakest link and may be increasingly banned from busy high-speed roads.

The communications systems to implement the connected vehicle applications referred to above include vehicle-to-vehicle (V2V) and vehicle-to-infrastructure (V2I) applications that require a minimum of one entity to send information to another entity. Broadly, short range communications that occur between a vehicle and any similarly equipped external object may be collectively referred to as "V2X" communications. For example, many vehicle-to-vehicle safety applications can be executed on one vehicle by simply receiving broadcast messages from one or more neighboring vehicles. These messages are not necessarily directed to any specific vehicle, but are meant to be shared with a vehicle population to support the safety application. In these types of applications where collision avoidance is desirable, as two or more vehicles talk to one another in a setting where a collision becomes probable, the vehicle systems can warn the vehicle drivers, or possibly take action for the driver, such as applying the brakes. Likewise, roadway infrastructure components, such as traffic control units, can observe the information broadcasts or otherwise sense vehicle traffic and provide a driver warning if there is a detected hazard (e.g., if a vehicle is approaching a curve at an unsafe speed or there is a crossing vehicle that is violating a red traffic signal phase).

Since V2X communication is a cooperative technology, the system is dependent on other similarly equipped entities to provide safety benefits. As such, V2X systems are subject to the network effect, where the value of the system increases as the fleet penetration increases. In the early years of deployment, certain safety and other features may only be available in a limited fashion, as number of communication vehicles is not sufficient to provide safety benefits on a large scale. Existing vehicles without communications equipment will not be able to communicate with newer vehicles that have been deployed with a V2X communications system. Therefore, it may be desirable to provide an aftermarket device that is able to be used with an existing vehicle to allow that vehicle to be capable of providing vehicle location and state information to other vehicles and enable a variety of V2X features on the host vehicle using location and state (of the road) information that is obtained from other communicating vehicles.

Connectability between autonomous vehicles includes a capability known as dedicated short range communications (DSRC) is a two-way short-to-medium-range wireless communications capability that permits very high data transmission critical in communications-based active safety applications. In Report and Order FCC-03-324, the Federal Communications Commission (FCC) allocated 75 MHz of spectrum in the 5.9 GHz band for V2X data streams used by Intelligent Transportations Systems (ITS) vehicle safety and mobility applications.

DSRC based communications is reportedly a major research priority of the Joint Program Office (ITS JPO) at the U.S. Department of Transportation (U.S. DOT) Research and Innovative Technology Administration (RITA).

DSRC was initially developed with a primary goal of enabling technologies that support safety applications and communication between vehicle-based devices and infrastructure to reduce collisions. DSRC is reportedly the only short-range wireless alternative currently available that provides designated licensed bandwidth for secure, reliable communications to take place. As noted above, that bandwidth is primarily allocated for vehicle safety and mobility applications by FCC Report and Order FCC 03-324; including fast network acquisition, as active safety applications require the immediate establishment of communication and frequent updates. DSRC also provides low latency, which is useful as active safety applications must recognize each other and transmit messages to each other in milliseconds without delay. DSRC further provides high reliability when required active safety applications require a high level of link reliability. DSRC works in high vehicle speed mobility conditions and delivers performance immune to extreme weather conditions (e.g. rain, fog, snow, etc.). DSRC provides priority for safety applications, in that safety applications on DSRC are given priority over non-safety applications; to support both V2V and V2I data streams; and safety message authentication and privacy.

Connected vehicle applications utilizing DSRC may have the potential to significantly reduce many of the most deadly types of crashes through real time advisories alerting drivers to imminent hazards—such as veering close to the edge of the road; vehicles suddenly stopped ahead; collision paths during merging; the presence of nearby communications devices and vehicles; sharp curves or slippery patches of roadway ahead.

Convenience services like e-parking and toll payment are also able to communicate using DSRC. Anonymous information from electronic sensors in vehicles and other devices, such as cellphones, and dongles can also be transmitted over DSRC to provide better traffic and travel condition information to travelers and transportation managers.

While the technology for connected vehicle applications has evolved considerably since the inception of autonomous vehicles, some related areas have lagged the development of suitable sensors and integration of sensor data with autonomous car applications. One such lagging area has been the development of devices that can be utilized to upgrade legacy vehicles (that do not include autonomous driving capabilities) to interface autonomous vehicle data streams. More particularly, there is an absence of portable devices that can be readily applied to legacy vehicles, without requiring any changes or modifications to the vehicle, which would permit legacy vehicles to be a part of the connected vehicle network.

Another area of shortcoming has been the sparse integration of vehicle diagnostic functions in devices utilized to interface with a connected vehicle data stream. While there have been disclosures suggesting the use of a vehicle diagnostic port in association with a connected vehicle application, such use is been limited, e.g., to implement diagnostic functions associated with the identification of terrain that would be suitable to engage in an analysis of mileage related tests or the like. However, there appears to have been little discussion respecting the combination of more encompassing diagnostic functions in association with devices used to interface vehicles with a connected vehicle data stream.

Diagnostic functions, may include identification of impending diagnostic conditions, e.g., low battery, low oil, low fuel, overheating, steering angle, vehicle identification number (VIN), BSMs, exterior light status, mileage, brake pad conditions, transmission gears, brake pedal status, ABS/SRS status, battery condition, TPMS tire pressure, seatbelt status of driver/passenger, turn signal status, data logger, ignition disable, fuel level, oil level, fuel level, emission system degradation, brake system failures and other information diagnostic functions are not only pertinent to the operation of the particular vehicle, but have bearing on how a particular vehicle interacts with other connected vehicles. For example, where a vehicle diagnostic system detects that a vehicle has a brake system condition, and communicates such information to the connected vehicle data stream, the speed and spacing of adjacent vehicle may be adjusted to accommodate that condition, with an appropriate safety margin. Alternatively, where diagnostic system determines that certain diagnostic sensor functions are inoperative, that information may also result in changes in the manner in which the particular vehicle is directed.

Ideally a device and system could be provided that incorporates enhanced diagnostic capabilities that could generate information that could be merged with a connected vehicle data stream, or utilized independent of the connected vehicle data stream, e.g., to diagnose and alert the driver of the diagnostic condition of the vehicle. As enhanced diagnostic capabilities are, in many respects tailored to the specific functional characteristics of a particular vehicle and associated parts, such enhanced diagnostic capabilities, may require access to a configuration database and a processor able to autonomously process the diagnostic information for a particular vehicle with a sufficiently low latency period to be suitable for use in conjunction with many connected vehicle applications.

It would further be desirable if such a device and system could be provided in an aftermarket product that is compatible with a wide range of legacy vehicles, can be easily installed by a vehicle owner and can be easily configured automatically based on the vehicle VIN at the time of installation.

U.S. Pat. No. 8,930,041 issued Jan. 6, 2015, to Grimm, et al., the contents of which are herein incorporated by reference, discloses an aftermarket plug-in safety device that allows a vehicle to communicate with other vehicles or infrastructures in a V2X communications system. The safety device is generally operable to be coupled to an OBD connector on the vehicle, and includes processing capabilities to identify the vehicle that it is coupled to by receiving data on a vehicle CAN bus, where the device performs self-configuring operations based on the type of vehicle, access to vehicle systems and location of the vehicle. The device also includes a radio for transmitting and receiving signals and a global navigation satellite system (GNSS) receiver for receiving location signals and providing vehicle position data. In this matter, the vehicle is able to communicate with other vehicles having similar communications capabilities.

U.S. Patent Publication No. 2017/0048080, to Grimm et al., the entire contents of which are herein also incorporated by reference, discloses an aftermarket communications device that can also be used in association with a vehicle to communicate with other vehicles or infrastructures in a V2X communications system. The communication device can be a plug-in device, a wireless device separate from the vehicle, such as a key fob, a smart phone, or a permanent retrofit device mounted to the vehicle. The communications device is electrically coupled to the vehicle by, for example, an OBD connection, a USB connection, a CAN bus connection, wireless connection or an HDMI connection. The communication device includes a radio for transmitting and/or receiving communications signals, a memory for storing security information and vehicle application data, a location processor such as a global navigation satellite system receiver and a verification processor configured to be put in electrical communication with a CAN bus on the vehicle, where the communications processor receives vehicle location signals from the location processor, files from the memory and signals from the radio.

Despite the advances in the development of connected vehicles, and proposals for devices to interface a connected vehicle data stream with existing "legacy" vehicles, there remains a need for a device that can readily be engaged to a vehicle, without the need for any modification of a vehicle or permanent attachment to a vehicle. Preferably the device is configured to not only interface the V2X data stream, but can also function to independently sense conditions, such as safety hazards in the vehicle environment, that can be used to actuate safety systems in the vehicle, and/or be communicated to other vehicles via the V2X data stream to allow actuation of safety systems in other vehicles as well. Such a device would be useful to allow many types of legacy vehicles to not only receive safety information from a V2X data stream, but also allows the legacy vehicle to display and act on the received information, and to contribute sensed information to the data stream, for use by other connected vehicles.

Preferably such a device would also incorporate a communication system that will allow the device to access enhanced vehicle diagnostic information, and to communicate the information to remote resources for autonomous evaluation. Such a communications system may include a handheld wireless communication circuit, in wireless communication with the device for displaying and processing the vehicle diagnostic information, and/or further communication of diagnostic information to remote database for evaluation. Alternatively, the device may include a cellular network communications circuit, to allow the device to communicate directly with a remote database or other resources, rather than communicate through the use of an intermediate wireless communication device.

By incorporating the various features described above, such a device would not only provide a means for generally interfacing legacy vehicles to a V2X data stream, but also derive information from the V2X data stream that can be used to regulate the operation of interface various vehicle display/actuating/diagnostic systems. Such a device would also facilitate the use of remote resources for processing vehicle diagnostic information and/or the V2X data stream in a manner suitable for cooperation with devices and systems of a particular legacy vehicle. By incorporating such connectivity and functionality within a single portable device, the resources of the vehicle, the V2X data stream, a handheld wireless communication device and/or a remote database may be collectively utilized to provide enhanced functionality in an efficiently distributed autonomous system.

BRIEF SUMMARY OF THE INVENTION

An automotive vehicle communication device is provided that is engageable to a vehicle, e.g., by engagement to a license plate fastener, or integration into a dongle, for interfacing a vehicle electrical system to a V2X data stream. In one embodiment, the device may be implemented in a housing engageable to the vehicle license plate and/or mounting bracket. Alternatively, the device may be integrated into housing engageable to the vehicle fastened to or magnetically engage to the roof, truck, or the front end of the vehicle.

A micro computing unit (MCU) is disposed within the housing, defining a processor and a memory. The MCU is configured to derive information from the V2X data stream. An antenna circuit is disposed within the housing, in communication with the MCU, and configured to receive and communicate the V2X data stream to the MCU. A vehicle electrical system connecting circuit is also provided for communicating the information derived from the V2X data stream to the vehicle electrical system.

The vehicle electrical system connecting circuit may be in communication with the vehicle diagnostic port either by hard wire connection or by wireless connection, e.g., to an aftermarket dongle connected to a vehicle diagnostic port and enabled for wireless communication with the vehicle communication device. In an alternate embodiment the device is integrated into the dongle, which is engageable to the vehicle diagnostic port. Communication with OBD diagnostic system would allow the vehicle to interface the V2X data stream at a higher level of participation. In addition to diagnostic information from the vehicle ECU, the dongle could also communicate an OEM telematics data exchange of basic safety message (BSM) contact between the vehicle and the V2X data stream, e.g., via an optional application that could be downloaded to the dongle.

The MCU may be configured to derive driver safety information from the V2X data stream and to communicate the driver safety information to the vehicle electrical system, for display in the vehicle.

The MCU may further be configured to generate a vehicle actuating signal(s), in response to the V2X information, and to communicate the vehicle actuating signal(s) to the vehicle electrical system, for actuating a vehicle safety system(s), such as a vehicle brake system.

In another embodiment the vehicle communication device is configured to generate a vehicle diagnostic system actuating signal(s) in response to the V2X information, and to communicate the vehicle diagnostic system actuating signal(s) to a vehicle electrical diagnostic system, to enable vehicle diagnostic functions.

The vehicle communication device may also comprise at least one sensor, connected to the housing, for generating operating and sensor information relating to an environment about the vehicle, the sensor being in communication with the MCU. In that embodiment, the MCU may further be configured to derive and communicate the sensor information to the vehicle electrical system, for actuating and that for display within the vehicle, and/or for actuating a vehicle safety system. The MCU may further be configured to communicate the sensor information signals to the antenna circuit, for transmission in a V2X signal format.

The vehicle communication device may further comprise a local wireless communication circuit, in communication with the MCU, for wireless communication of the sensor information signal(s) to the vehicle electrical system, for processing and display within the vehicle, or to a handheld wireless communication device for processing and display within the handheld device and/or for further communication by the handheld device to a remote database.

The vehicle communication device may alternatively/additionally comprise a cellular network communication circuit, in communication with the ECU, for communicating the sensor information and/or information derived from the V2X data stream directly to a remote database and/or other remote resources.

Where the vehicle includes a suitable vehicle electronic control unit (ECU), or similar device, the vehicle electrical system connecting circuit may be in communication with the ECU for accessing vehicle diagnostic data from the ECU.

The MCU may be configured to derive vehicle diagnostic information from the vehicle diagnostic data received from the ECU and/or various other vehicle systems, and to communicate that information to the driver and/or the antenna circuit, for transmission into the V2X data stream.

Alternatively/additionally the MCU may be configured to communicate the diagnostic information to a cellular network communication circuit, for communicating the diagnostic information to a remote diagnostic database for further analysis, the results of which may be communicated for display in the vehicle, e.g., on the center stack/information system, or on a handheld wireless communication device used by the driver. Information derived from the analysis may also be transmitted by the vehicle into the V2X data stream.

As described above in connection with the sensor information signals, the MCU may be configured to communicate the vehicle diagnostic information to a wireless communication circuit, for communication to a handheld wireless communication device, for processing and display on the wireless communication device, or for further communication to the remote diagnostic database.

The wireless communication device may further comprise a camera, connected to the housing and in communication with the MCU, wherein the camera is configured to generate camera images of an environment proximate the vehicle. The MCU may be configured to derive camera image signals from the camera images and to communicate the camera image signals to the vehicle electrical system, by hard wire or by wireless communication circuit, for display within the vehicle. Other options such as parking sensors, LIDAR, weather sensors, etc., would allow the vehicle to interface the V2X data stream at a higher level, i.e., approaching level 5 of autonomous operation.

Alternatively/additionally, the MCU may be configured to communicate the camera image signals to the antenna circuit for transmission into the V2X data stream.

Alternatively/additionally, the MCU may also be configured to communicate the camera image signals to a wireless communication circuit for communication to a handheld communication device, for processing and display on the handheld device and/or for further communication to a remote database or other resources.

The vehicle communication device may be disposed in a housing located adjacent a license plate, e.g., below the license plate, and connected to the license plate by the license plate fasteners.

Alternatively, the vehicle communication device housing may form a portion of a vehicle license plate frame, e.g., located in, on or around the license plate.

In another embodiment the processing and communication functionality of the vehicle communication device may be integrated into an aftermarket dongle, that is engaged to the vehicle diagnostic port.

The MCU may be further configured to detect malfunctions in the sensors, the camera and/or interruption of the communication between the MCU and the V2X data stream. Upon detection of such malfunction or interruption, the MCU may be further configured to communicate a malfunction signal to the vehicle electrical system, for display within the vehicle. The malfunction signal may alternately/additionally be communicated to the V2X data stream, to the handheld wireless communication device and/or to a remote database or other website for analysis and responsive action.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION OF THE PRESENTLY PREFERRED EMBODIMENTS

The following descriptions of the illustrated embodiments of the invention are intended to be merely exemplary in nature, and are no way intended to limit the invention or its applications or uses.

As noted above, connected vehicle applications provide connectivity among vehicles to help prevent crashes, between vehicles and infrastructure to enable safety, mobility and environmental sustainability, among vehicles, infrastructure, and passengers' wireless devices to provide continuous real-time connectivity to all system users. As described below, the present invention functions to extend that connectivity to unconnected ("legacy") vehicles, that do not have DSRC capability, or full DSRC capability.

Potential DSRC transportation applications for public safety and traffic management are presently understood to include at least the following:

Blind spot warnings;
Forward collision warnings;
Sudden braking ahead warnings;
Do not pass warnings;
Intersection collision avoidance and movement assistance;
Approaching emergency vehicle warning;
Vehicle safety inspection;
Transit or emergency vehicle signal priority;
Electronic parking and toll payments;
Commercial vehicle clearance and safety inspections;
In-vehicle signing;
Rollover warning; and
Traffic and travel condition data to improve traveler information and maintenance services.

Figure 1:
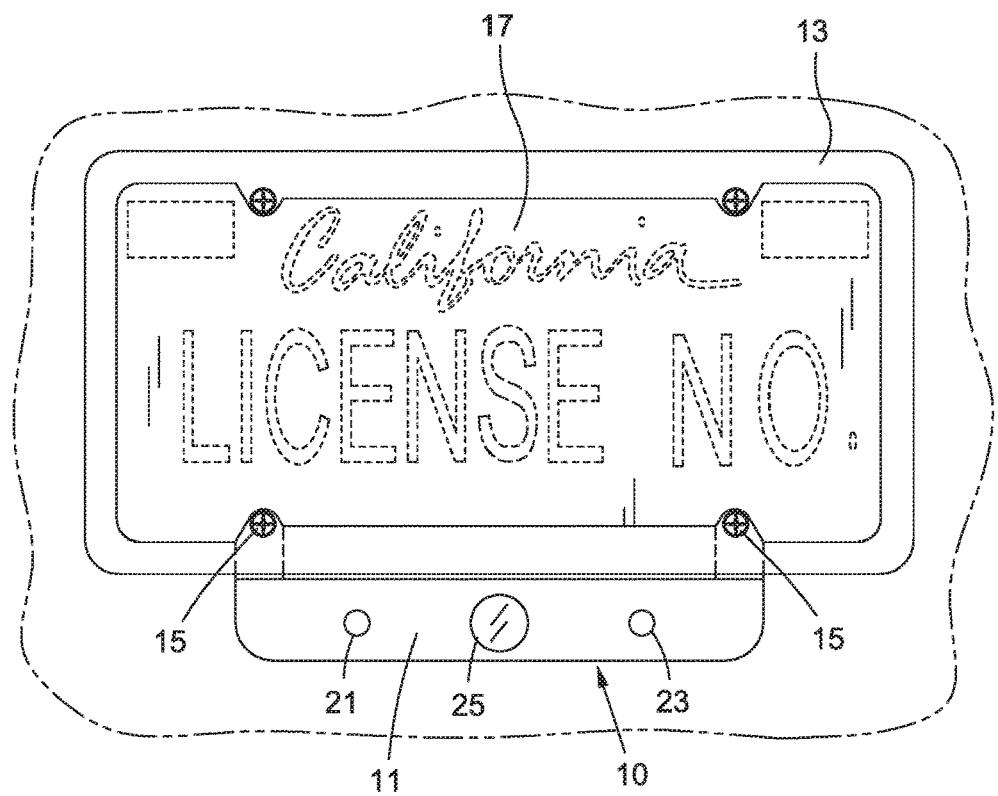
FIG. 1 is an illustration of one embodiment of the vehicle communication device, in accordance with the present invention, connected to the lower portion of a license plate.

Referring to the drawings, FIG. 1 illustrates the construction of an exemplary vehicle communication device 10, which secures to a vehicle license plate frame 13 that extends about a vehicle license plate 17. The vehicle communication device may be an aftermarket device, i.e., not on the vehicle when originally manufactured, that may be readily connected to and disconnected from the vehicle without any permanent change to the vehicle. As shown in FIG. 1, the device 10 defines a housing 11 which may include a plurality of apertures configured to receive fasteners, such as license plate fasteners 15, to secure the housing the housing 11 to the vehicle. In other embodiments the housing may be implemented as a dongle engaged to a vehicle diagnostic port, or as a bug or similar electronic device secured to the vehicle, e.g., by magnetic engagement to an exterior surface of the vehicle.

Housing 11, which is shown as a handheld device, may be provided with a plurality of sensors 21, 23, which may be implemented as various types of sensors used for connected vehicle applications, e.g., LIDAR, proximity sensors, stereo vision, etc. Camera 25 may also be connected to the housing 11. Information from sensors 21, 23, and camera 25, and information from the vehicle, e.g., vehicle diagnostic information, may be communicated to a V2X data stream in a manner similar to that described in, inter alia, U.S. Pat. No. 8,930,041 to Grimm et al. for *Methods of Operating for Plug-in Wireless Safety Device*, and U.S. Patent Publication Number 2017/0048080 to Grimm et al. for *Method and apparatus for Plug-In Wireless Safety Devices*, the contents of which are incorporated by referenced herein.

Figure 2:
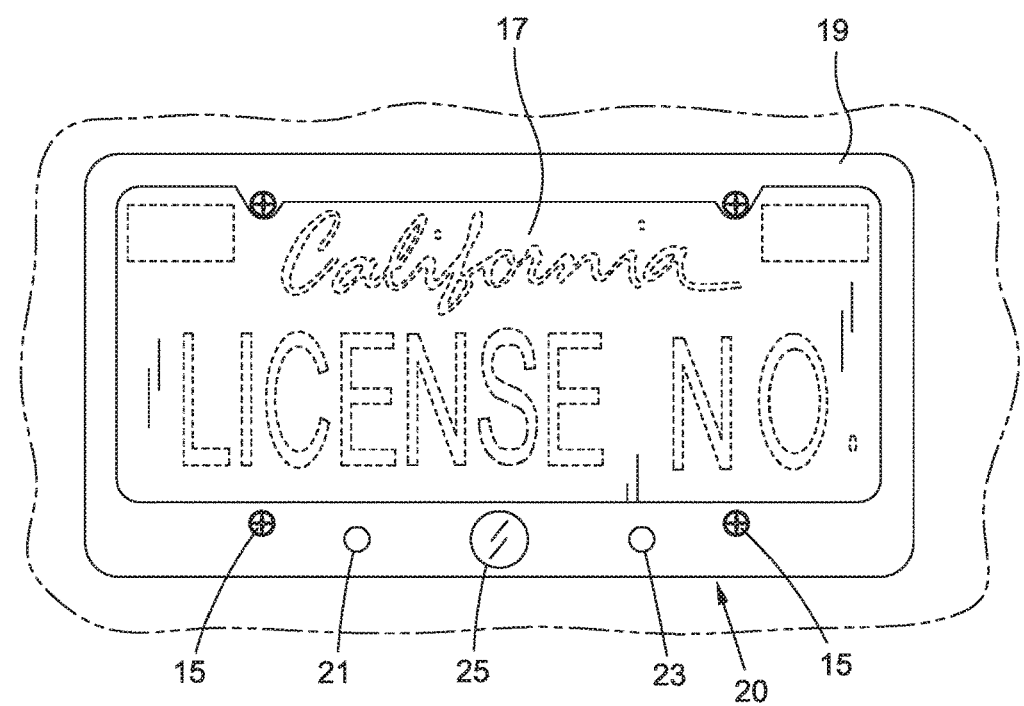
FIG. 2 is an illustration of an alternate embodiment of the vehicle communication device, implemented in a vehicle license plate frame.

FIG. 2 indicates an alternate implementation of the vehicle communication device, wherein, the vehicle communication device 20 is an integral portion of the license plate frame 19, rather than a separate housing connected to the license plate frame, as shown at FIG. 1. Referring again to FIG. 2, a vehicle communication device 20 is provided wherein the sensors 21, 23 and camera 25 are connected directly to the vehicle license plate frame.

Figure 3:
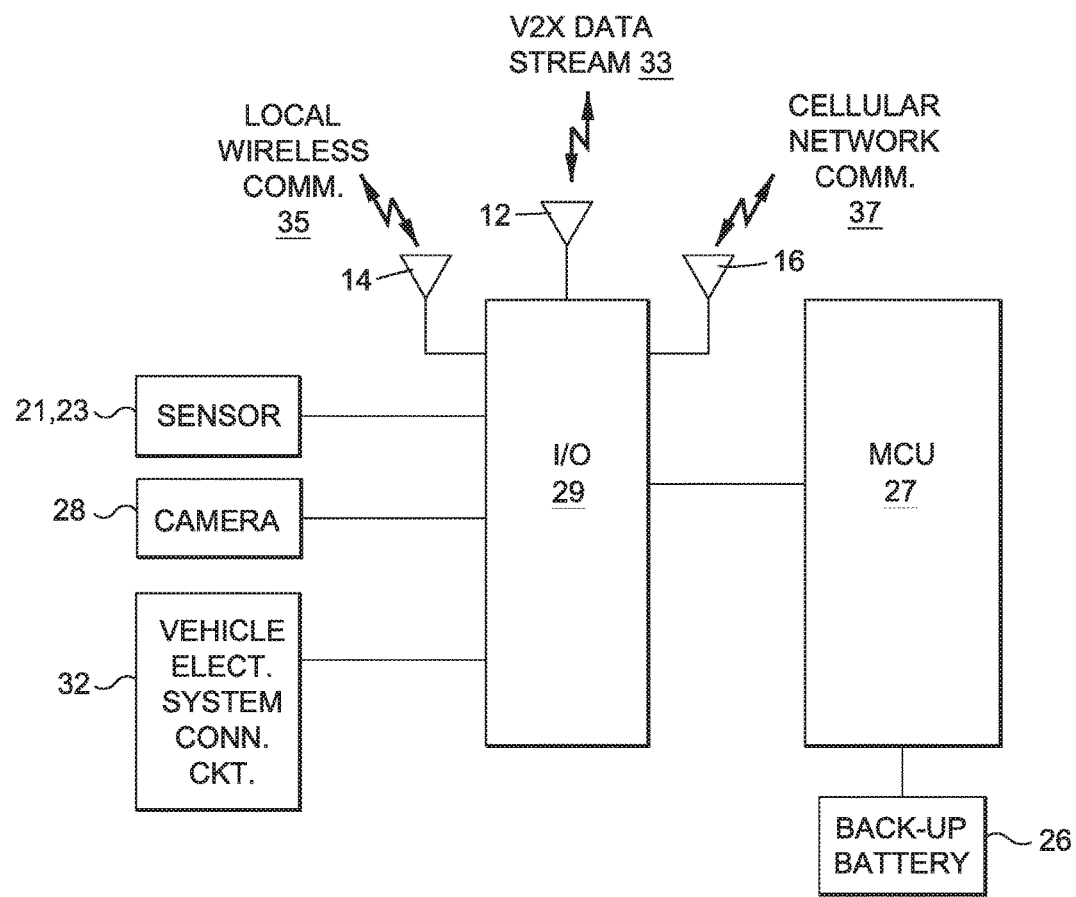
FIG. 3 is a block diagram showing the principle circuit components of an exemplary vehicle communication device.

FIG. 3 is a block diagram of an exemplary vehicle communication device 10. As shown therein the vehicle communication device 10 includes a micro computing unit (MCU) 27 connected to input/output circuit 29, which communicates information to and from the MCU 27. Input/output circuit 29 is in communication with sensors 21, 23, camera 28 and vehicle electric system connecting circuit 32.

The vehicle electric system connecting circuit 32 may be in communication with the vehicle diagnostic port, either by wired or wireless connection, to provide power to the device 10 and/or to facilitate the transfer of information to and from the vehicle electrical system. Information from the vehicle electrical system may include vehicle identification information, vehicle status information, vehicle diagnostic information (e.g., vehicle trouble codes, I/M readiness, live data), vehicle sensor/camera information, GPU information, etc. Information communicated from the vehicle electrical system connecting circuit 32 to the vehicle may include information for display within the vehicle, audio signals for broadcast within the vehicle should consider, and actuating commands for vehicle safety and/or diagnostic systems, such as braking circuits, battery reset and initiation, oil light resets, steering angle resets and network scans.

In the input/output circuit 29 further regulates wireless communications with the V2X data stream 33, via antenna circuit 12, with local wireless communication circuit 35 via antenna 14 (e.g., communications with a dongle connected to the vehicle, communications with a vehicle OEM wireless communication circuit, communications with a cellphone, etc.), communications with cellular network 37 via antenna circuit 16, and wired communications with the vehicle. Backup battery 26 provides reserve power to the MCU 27, when power is not available through the vehicle electrical system connecting circuit 32.

Figure 4:
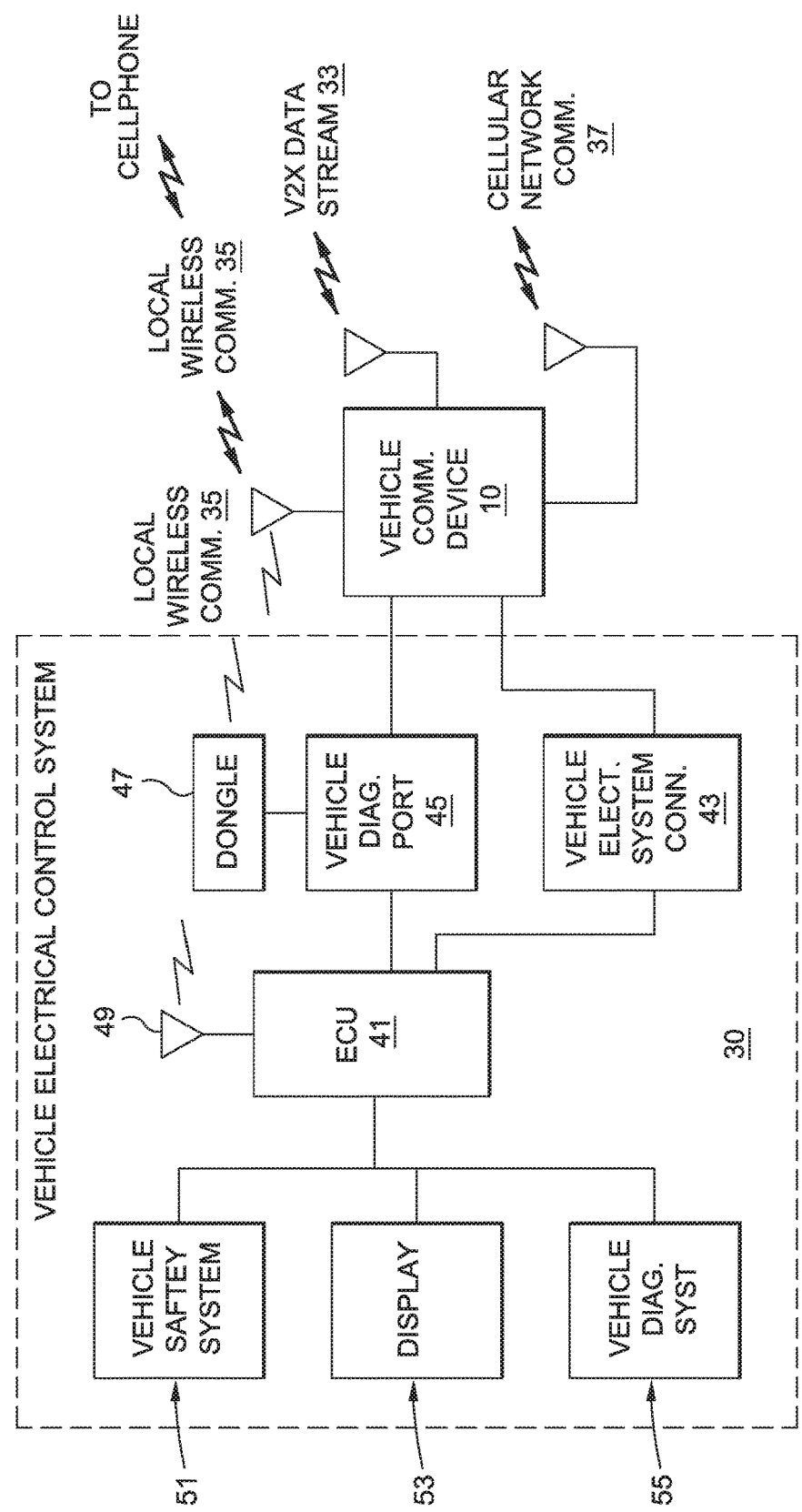
FIG. 4 is a block diagram illustrating the connectivity between the vehicle communication device and various portions of a vehicle electrical system.

FIG. 4 is a block diagram showing various portions of the vehicle electrical control system that interface with vehicle communication device 10. As shown therein vehicle communication device 10 communicates with the vehicle electrical control unit (ECU) 41 in various ways. For example, the vehicle communication device 10 may be hardwired to a vehicle electrical system connector 43 or vehicle diagnostic port 45, both of which may provide power to the vehicle communication device and may communicate with ECU 41. Alternately/additionally, vehicle communication device 10 may be in wireless communication with the vehicle diagnostic port 45 via wireless communication circuit 35, which may wirelessly communicate with a compatible handheld aftermarket dongle 47, which may be physically connected to the vehicle diagnostic port 45. Alternatively, local wireless communication circuit 35 may be a direct wireless communication with ECU 41 or other components of an OEM wireless communication system via antenna 49 which may be directly connected to the ECU 41, or may form an internal portion of ECU 41. Moreover, the structure and function of at least portions of the vehicle communication device 10 such as the MCU 27, input/output circuit 29, vehicle electrical system connection circuit 32 and antenna circuit 12, 14, and 16 (See FIG. 3) may be incorporated into the dongle 47.

Figure 5:
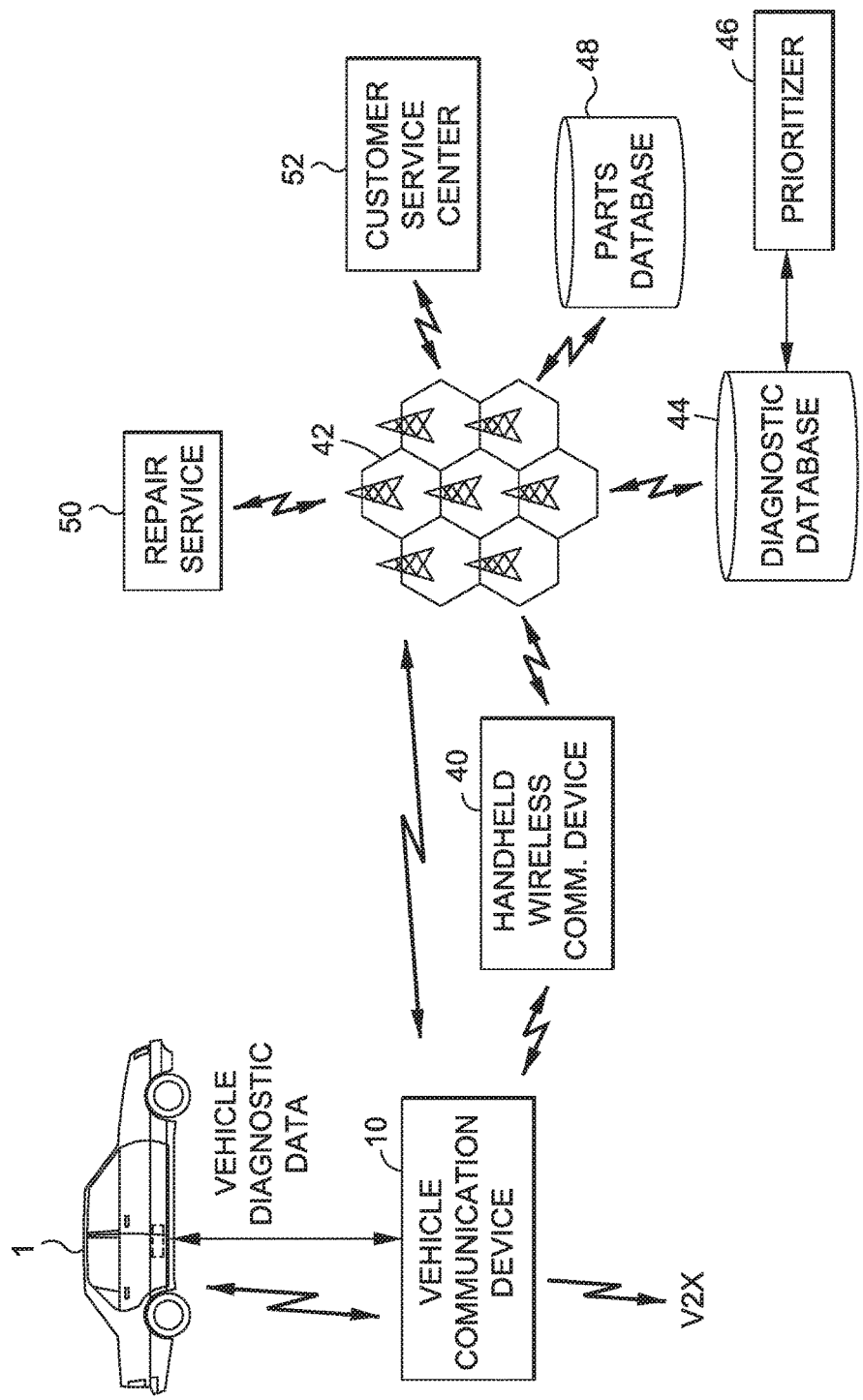
FIG. 5 is a block diagram illustrating the connectivity between the vehicle communication device and the V2X data stream, and other external resources for facilitating the distribution of information and enhanced functionality between the functional units.

The ECU 41 is also in communication with numerous vehicle safety systems 51, such as a vehicle brake system, display 53 and vehicle diagnostic system 55. The display may be an original equipment manufacturer (OEM) navigation/entertainment system 53 or may be a separate display, such as the display incorporated on a handheld wireless communication device. Audible alerts may be routed to the vehicle speaker systems and/or be used to modulate the vehicle lighting system. Communication protocols and other information to enable communication with a full complement of OEM and non-OEM vehicle systems may be derived from vehicle identification information at a remote database, at the dongle or at a handheld wireless communication device such as a cellphone as shown at FIG. 5. The derived protocols and other may be used to configure the vehicle communication device for deep communication with a range of vehicle systems. Consequently, as will be apparent to those skilled in the field, the vehicle diagnostic system 55 is intended to be representative of any or all of the various diagnostic monitors disposed about the vehicle electrical and mechanical systems that collectively make up the vehicle on-board diagnostic system.

FIG. 5 illustrates a block diagram showing the external network environment to which the vehicle communication device 10 interfaces. As shown therein, the vehicle communication device 10 is in wired and/or wireless communication with various systems and devices within the vehicle 1, as shown in FIG. 4. The vehicle communication device 10 also wirelessly communicates with the V2X data stream, and with the cellular network 42, either directly or through a handheld wireless communication device 40 that is in communication with the cellular network 42.

Diagnostic database 44, parts database 48, customer service center 52 and repair service 50 also communicate with the cellular network 42 to be able to provide diagnostic processing, V2X processing, integration of both diagnostic and V2X data cyber security functionality, and customer support functionality. Prioritizer 46 is in communication with the diagnostic database 44 and functions to facilitate prioritization of various diagnostic conditions that may contribute to the generation of diagnostic trouble codes or other conditions in the operation of vehicle 1. As such, the vehicle communication device may be implemented to combine the functionality of a diagnostic scan tool and a V2X interface device, which functionalities may be augmented by communication with remote resources.

Various diagnostic functionalities that may be implemented by the vehicle communication device 10, either by itself or in combination with a remote data base or other resources, are described herein in more detail in the following references, which are commonly owned by Innova Electronics Corporation, the common assignee of the present invention: U.S. Pat. No. 6,807,469 for Auto Diagnostic Method and Device; U.S. Pat. No. 8,068,951 for Vehicle Diagnostic System; U.S. Pat. No. 8,825,270 for Method and Apparatus for Indicating an Automotive Diagnostic Urgency; U.S. Pat. No. 9,324,194 for Method and System for Database Compilation on a Remote Electric Device; U.S. Pat. No. 9,646,427 for System for Detecting the Operational Status of a Vehicle Using a Handheld Communication Device; U.S. Pat. No. 8,370,018 for Automotive Diagnostic Process; U.S. Pat. No. 8,880,274 for Cellphone Based Vehicle Diagnostic System; U.S. Pat. No. 9,014,908 for Multi-Stage Diagnostic System and Method; U.S. Pat. No. 9,141,503 for Vehicle-Specific Diagnostic Reset Device and Method; U.S. Pat. No. 9,646,432 for Hand Held Data Retrieval Device with Fixed Solution Capability; U.S. Pat. No. 9,177,428 for Predictive Diagnostic Method; U.S. Pat. No. 7,620,484 for Automotive Mobile Diagnostics; and U.S. Patent Publication Number 2015/0032607 for Mobile Device Based Vehicle Diagnostic System. The contents of each of those references are hereby incorporated by reference herein, in their entirety.

As will be apparent to those of ordinary skill in the art, the vehicle communication device of the present invention may be adapted for a variety of different applications. One such application would be to temporarily enable a legacy vehicle to interface with V2X data streams to facilitate long trips, or trips over roadways that may be restricted for use by V2X enabled vehicles. In such circumstances the application could proceed as follows.

The legacy vehicle could be provided with a vehicle communication device in accordance with the present invention, configured for attachment to a license plate or some other convenient attachment location. Once the vehicle device is placed in communication with a vehicle diagnostic port or the like, the device could initiate communication with the vehicle ECU by polling the diagnostic port for the correct ECU protocol, as is typically done by contemporary scan tools and code readers such as the Model 5160 CarScan Pro scan tool marketed by Innova Electronics Corporation. Alternatively, the vehicle identification information may be derived using a cellphone or other device to scan the bar code information typically found on the vehicle dashboard or on a door panel, using a cellphone or other device.

The vehicle identification information may be communicated to the remote database where the vehicle identification information may be used to access information respecting other vehicle electrical system components, communication protocols utilized to communicate with those electrical systems components and other information applicable to the particular vehicle. The accessed information may then be communicated to the vehicle communication device to properly configure the vehicle communication device for communication with the vehicle diagnostic system and other electrical system components that may be in communication with the vehicle ECU or otherwise accessible by connecting the vehicle communication device to the vehicle electrical system at other locations.

Once properly configured, the vehicle communication device may be operative to receive the V2X data stream and to derive vehicle actuation/display/information signals, from the received V2X data stream that are appropriate for that particular vehicle. Similarly, once properly configured the vehicle communication device could format the vehicle information, sensor information, camera imagery, diagnostic information and/or diagnostic solutions, as may be generated by the vehicle, and/or received from the remote database/wireless communication device for transmission into the V2X data stream. As such the vehicle communication device enables information exchange and other interaction between the vehicle and the V2X data stream in a sufficiently robust manner to support at least the level of V2X functionality that may be required for a particular trip. As will be apparent to those skilled in the art, the functionality of such a system may be distributed between the vehicle communication device, a dongle engaged to communication with the vehicle diagnostic port, a remote database and/or an intermediate wireless communication device, as may be most efficient and most convenient for a particular vehicle and application.

In one embodiment many or all of the processing and communication functions of the vehicle communication device may be integrated into an aftermarket dongle, engaged to or otherwise in communication with the vehicle diagnostic port. In that embodiment, the sensors and/or camera could be located elsewhere, e.g., attached to the license plate, or excluded from the system.

In another embodiment of the present invention may be utilized with a vehicle that is equipped with a multi-domain ECU where the domains are connected to a common switch that is in communication with multiple inputs, such as a vehicle ITS station (host router), a diagnostic input, and other inputs. The ECU(s) may include a diagnostic/emissions domain, a safety system domain, an infotainment domain, and other domains, all in communication with the switch. In such a vehicle the invention may be implemented by connecting an aftermarket sensor(s)/camera(s) to one switch input, with diagnostic communications/control signals communicated to another switch input via the diagnostic port input and/or via a local communication network/cellular communication network input. Application programs loaded onto the switch, e.g., from a remote location, to configure the switch to route the communications to and from the various domains and the switch to achieve functionality as described above. See further SAE Vehicle Interface Methodology Standard Proposal—Status Report, December 2015.

Theft of the vehicle communication device is also a factor in determining where the device is located. Where components can be effectively disposed within the vehicle, e.g., on a dashboard or engage to a windshield visor, theft may be less of a concern. However where other components may need to be disposed on an exterior surface of the vehicle to be more effective, then it may be preferable to have those components more firmly, or permanently engaged to the vehicle to mitigate theft.

It is also anticipated that more complex processing functions could occur at the database, where greater resources and processing functionality could be located. Further, the distribution of processing functions could be determined based upon the latency requirements of a particular function. Where, for example, automotive safety messages require a quick response in the vehicle, delays in communication of the V2X data stream to a remote location and back, as well as processing requirements at the remote database, may require that the processing be implemented locally at the vehicle, in some cases with support of a wireless communication device, such as the driver's cellphone. It is anticipated that the dongle other wireless communication device and/or switch in the vehicle internal electrical system could be configured to segregate the processing functions between the wireless communication device, the vehicle ECU or other on-board switch, the remote database, and other resources based on the urgency and required response time, i.e., the latency, for particular functionality, as well as the processing capability of a particular vehicle. In accordance with the present invention, as further described below, the process for implementing the invention may proceed autonomously, to mitigate latency at the vehicle communication device, the wireless communication device and/or the remote database. This enables more functionality to be implemented at a remote database and the wireless communication device, thereby mitigating the complexity and expense of the vehicle communication device. Further, scope and related ability of the database, e.g., to identify and evaluate the V2X and diagnostic information, is a factor in the ability to enhance safety, reliability and functionality of the present invention. One such enhanced relatable database(s) is the Innova Electronics Corporation's diagnostic database which has been developed for over fifteen (15) years, and allows diagnosing over 3 million possible diagnostic conditions for domestic and foreign cars, light trucks, vans, SUVs and hybrid vehicles. Without such a robust database, the functionality and reliability of such a distributed system would be considerably less. The remote database could be configured to evaluate such function features for a particular vehicle, and autonomously configure the dongle, the wireless communication device and/or the vehicle communication device accordingly.

One exemplary process for implementing the present invention to configure a vehicle communication device to interface a legacy vehicle to a V2X data stream proceeds as follows:

the vehicle communication device is provided that may incorporate attached sensors and a camera, and is preconfigured to receive a V2X signal stream, as well as, sensor data and camera imagery from the attached sensor(s) and camera(s);

the vehicle communication device is attached to vehicle and engaged to power source, e.g., at an electrical connector block;

a compatible dongle is engaged to vehicle diagnostic port;

the dongle autonomously connects to the vehicle ECU and derives the proper ECU communication protocol to receive vehicle identification information and vehicle data, e.g., vehicle diagnostic data stored in the ECU;

the information/data received by dongle is autonomously communicated to a wireless communication device (e.g., cellphone) paired to the dongle;

the wireless communication device autonomously communicates the information/data received from the vehicle to a remote database that autonomously generates vehicle communication device/dongle/ECU/wireless communication device configuration information for the particular vehicle and autonomously communicates the configuration information to wireless communication device;

the wireless communication device autonomously communicates the configuration information to the vehicle communication device/ECU and/or the dongle;

in response to the configuration information, the vehicle communication device, ECU, dongle and/or wireless communication device autonomously configures itself to derive vehicle specific display information/safety information/vehicle actuating signals from the received V2X data stream, and communicates the derived vehicle specific information/actuating signals to vehicle electrical system via wireless communication with the dongle; and the vehicle communication device, ECU, dongle or wireless communication device autonomously formats information/data received from the vehicle electrical system/the dongle/the sensors/the camera/the remote data base for communication into V2X data stream.

As it will be apparent to one of ordinary skill in the art, the above process may be modified in various ways without departing from the autonomous aspects of the invention. For example, in one embodiment the vehicle communication device could be hardwired to the vehicle diagnostic port, or to another location, where the vehicle communication device may receive the vehicle data. In such circumstances, there could be no need to utilize dongle.

In another embodiment, the vehicle communication device could be battery-powered, and, after installation on the vehicle could configure itself to receive the V2X data stream, sensor data and/or camera imagery.

Importantly, the components of the present invention allow the vehicle communication device, the ECU and/or the dongle to be configured for a particular vehicle after purchase, and after mounted on a vehicle. Such, configuration may proceed autonomously in response to engagement of a dongle to the vehicle diagnostic port and/or engagement of the vehicle communication device to a power source, depending on the particular vehicle and the desired level of functionality.

In some business models, the configuration may be preceded or supplemented by an e-commerce application for processing payments or security deposits, for use of the vehicle communication device, for use of certain capabilities at the database and/or to achieve a particular level of functionality. The configuration may also be proceed by confirmation that the particular legacy vehicle has sufficient inherent capability to properly interface with the vehicle communication device at a desired level of functionality.

As will also be apparent to one of ordinary skill in the art, the vehicle communication device may be a permanently or temporarily mounted on a legacy vehicle at locations other than the vehicle license plate, e.g., within an aperture formed in the vehicle front end, or in a housing magnetically secured to the vehicle. The vehicle communication device may also be segmented to allow the sensor(s) and/or camera(s) to be mounted in one location, e.g., on a windshield visor, with the MCU and various wireless communication circuits, and associated functionalities are implemented elsewhere, such as in the dongle engaged to the vehicle diagnostic port. As such, distribution of the functionalities described above, the physical components of the system and/or processing functions may also be distributed within the vehicle, or between on-board and remote resources, as may be most efficient and convenient for a particular vehicle and the desired level of functionality, without departing from the broader scope and functionality of the present invention.

These and other constructions and functions for implementation of the present invention will be apparent to those of ordinary skill in the art, or may become apparent to those of ordinary skill in the art as the applications for and use of V2X systems continue to expand.

Accordingly, the above description is given by way of example, and not limitation. Given the above disclosure, it is anticipated that one skilled in the art would recognize other implementations of the present invention that are also within the scope and spirit of the disclosure herein. Further, it should also be apparent that the various features of the embodiments disclosed herein may be used alone, or in varying combinations with each other. Thus, the scope of the claims is not to be limited by the illustrated embodiments or the specific combination of structure of functionalities described herein.

What is claimed is:

1. An aftermarket vehicle communication device engageable to a vehicle, for interfacing a vehicle electrical system to a V2X data stream, the device comprising:
   a housing detachably engageable to the vehicle;
   a micro computing unit (MCU) disposed within the housing, the MCU defining a processor and a memory, the MCU being configured to derive information from the V2X data stream;
   an antenna circuit, disposed within the housing and in communication with the MCU, the antenna circuit being configured to receive and communicate the V2X data stream to the MCU; and
   a vehicle electrical system connecting circuit disposed within the housing and in electrical communication with the MCU, the vehicle electrical system connecting circuit being placeable in communication with the vehicle electrical system for communicating the information derived from the V2X data stream to the vehicle electrical system.

2. The device as recited in claim 1 wherein the vehicle electrical system connecting circuit is placeable in electrical communication with a vehicle diagnostic port.

3. The device as recited in claim 1 wherein the MCU is configured to derive driver safety information from the V2X data stream and to communicate the driver safety information to the vehicle electrical system, for display in the vehicle.

4. The device as recited in claim 3 wherein the MCU is further configured to generate a vehicle actuating signal, in response to the V2X information, and to communicate the vehicle actuating signal to the vehicle electrical system, for actuating a vehicle safety system.

5. The device as recited in claim 3 wherein the MCU is further configured to generate a brake actuating signal in response to the V2X information, and to communicate the brake actuating signal to the vehicle electrical system, for actuating a vehicle brake system.

6. The device as recited in claim 3 wherein the MCU is further configured to generate a vehicle diagnostic system actuating signal in response to V2X information, and to communicate the vehicle diagnostic system actuating signal to the vehicle electrical diagnostic system, to enable vehicle diagnostic functions.

7. The device as recited in claim 6 wherein the vehicle diagnostic functions include diagnostic testing functions.

8. The device as recited in claim 1 further comprising at least one sensor, connected to the housing, for generating sensor information relating to an environment about the vehicle, the sensor being in communication with the MCU.

9. The device as recited in claim 8 wherein the MCU is configured to derive sensor information signals from the sensor information, and to communicate the sensor information signals to the vehicle electrical system, for display within the vehicle.

10. The device as recited in claim 9 wherein in the MCU is further configured to communicate the sensor information signals to the antenna circuit, for transmission into the V2X data stream.

11. The device as recited in claim 10 wherein the MCU is further configured to communicate the sensor information signals to the vehicle electrical system, for actuating a vehicle safety system.

12. The device as recited in claim 10 further comprising a local wireless communication circuit in communication with the MCU, and configured for wireless communication of the sensor information signals to the vehicle electrical system.

13. The device as recited in claim 12 wherein the local wireless communication circuit is further configured for wireless communication of the sensor information signals to a handheld wireless communication device.

14. The device as recited in claim 12 further comprising a cellular network communication circuit, in communication with the MCU, and configured for wireless communication of the sensor information signals to a remote diagnostic database.

15. The device as recited in claim 8 wherein the MCU is configured to detect a malfunction in the at least one sensor, and to communicate a sensor malfunction signal to the vehicle electrical system, for display within the vehicle.

16. The device as recited in claim 1 wherein the vehicle includes a vehicle electronic control unit (ECU), and wherein the vehicle electrical system connecting circuit is placeable in communication with the ECU for receiving vehicle diagnostic data from the ECU.

17. The device as recited in claim 16 wherein the MCU is configured to derive vehicle diagnostic information from the vehicle diagnostic data, and to communicate the vehicle diagnostic information to the antenna circuit, for transmission into the V2X data stream.

18. The device as recited in claim 17 further comprising a cellular network communication circuit, in communication with the MCU, wherein the MCU is configured to communicate the vehicle diagnostic information to a cellular communication network, for communication to a remote diagnostic database.

19. The device as recited in claim 17 wherein the MCU is configured to derive vehicle diagnostic information from the vehicle diagnostic data, and to communicate the diagnostic information to the vehicle electrical system for display.

20. The device as recited in claim 1 further comprising a camera connected to the housing and in communication with the MCU, wherein the camera is configured to generate camera images of an environment proximate the vehicle.

21. The device as recited in claim 20 wherein the MCU is configured to derive camera image signals from the camera images.

22. The device as recited in claim 21 wherein the MCU is configured to communicate the camera image signals to the vehicle electrical system for display within the vehicle.

23. The device as recited in claim 21 wherein the MCU is configured to communicate the camera image signals to the antenna circuit, for transmission into the V2X data stream.

24. The device as recited in claim 21 further comprising a wireless communication circuit, in communication with the MCU, for wireless communication with a handheld wireless communication device, and wherein the MCU is configured to communicate the camera image signals to the wireless communication circuit, for communication to the handheld wireless communication device.

25. The device as recited in claim 20 wherein the MCU is configured to detect a malfunction in the camera, and to communicate a camera malfunction signal to the vehicle electrical system, for display within the vehicle.

26. The device as recited in claim 1 wherein the housing includes a handheld device disposed adjacent a vehicle license plate and is manually engageable to the vehicle by license plate fasteners.

27. The device as recited in claim 1 wherein the housing forms at least a portion of a license plate frame and is engaged to the vehicle by license plate fasteners.

28. The device as recited in claim 1 wherein the housing defines an aftermarket dongle, configured for communication with a vehicle diagnostic port.

29. The device as recited in claim 1 wherein the MCU is configured to detect interruption of communication between the MCU and the V2X data stream, and to communicate a vehicle disconnect signal to the vehicle electrical system in response to such detection, for display within the vehicle.

30. A method of interfacing a vehicle electrical system of a legacy vehicle to a V2X data stream, the method comprising:
  a. providing an aftermarket vehicle communication device that is configured to receive a V2X signal stream;
  b. releasably engaging the vehicle communication device to the vehicle;
  c. providing power to the vehicle communication device;
  d. engaging a dongle to a vehicle diagnostic port of the vehicle, the diagnostic port being in communication with a vehicle electronic control unit (ECU);
  e. receiving at the dongle, vehicle data from the ECU the vehicle data including vehicle identification information and vehicle diagnostic data;
  f. communicating the vehicle identification information and the vehicle diagnostic data to a wireless communication device, the wireless communication device being in communication with the dongle;
  g. communicating the vehicle identification information and the vehicle diagnostic data from the wireless communication device to a database, the database being configured for deriving vehicle communication device configuration information from the vehicle identification information and to communicate the vehicle communication device configuration information to the wireless communication device;

h. communicating the vehicle communication device configuration information from the wireless communication device to the vehicle communication device;

i. configuring the vehicle communication device, in response to receipt of the vehicle configuration information at the vehicle communication device, to enable the vehicle communication device to derive vehicle specific information and vehicle specific actuating signals from the received V2X data stream, and to communicate the vehicle specific information and vehicle specific actuating information to the dongle, for communication to the ECU.

31. The method as recited in claim 30 wherein steps e.-l, proceed autonomously, in response to engagement of the dongle to the vehicle diagnostic port.

32. The method as recited in claim 30 further comprising the steps of:

j. configuring the database for deriving vehicle diagnostic information from the vehicle data received from the wireless communication device, and for communicating the vehicle diagnostic information from the database to the wireless communication device;

k. communicating the vehicle diagnostic information received by the wireless communication device to the vehicle communication device;

l. formatting the vehicle diagnostic information received by the vehicle communication device for communication into the V2X data stream.

33. The method as recited in claim 32 wherein steps e.-l, proceed autonomously in response to engagement of the dongle to the vehicle diagnostic port.

34. A method of interfacing a vehicle electrical system of a legacy vehicle to a V2X data stream, the method comprising:

a. providing an aftermarket dongle that is configured to receive a V2X signal stream;

b. releasably engaging the dongle to a vehicle diagnostic port of the vehicle, the diagnostic port being in communication with a vehicle electronic control unit (ECU);

c. receiving at the dongle, vehicle data from the ECU the vehicle data including vehicle identification information and vehicle diagnostic data;

d. communicating the vehicle identification information and diagnostic data to a wireless communication device, the wireless communication device being in communication with the dongle;

e. communicating the vehicle data from the wireless communication device to a database, the database being configured for deriving configuration information from the vehicle identification information and to communicate the configuration information to the wireless communication device;

f. communicating the configuration information from the wireless communication device to dongle;

g. configuring the dongle, in response to receipt of the configuration information at the dongle, to enable the dongle to derive vehicle specific information and vehicle specific actuating signals from the received V2X data stream, and to communicate the vehicle specific information and vehicle specific actuating signals to the dongle, for communication to the ECU.

35. The method as recited in claim 34 wherein steps c.-g. proceed autonomously in response to engagement of the dongle to the vehicle diagnostic port.

36. The method as recited in claim 34 further comprising the steps of:

h. configuring the database for deriving vehicle diagnostic information from the vehicle diagnostic data received from the wireless communication device, and for communicating the vehicle diagnostic information from the database to the wireless communication device;

i. communicating the vehicle diagnostic information received by the wireless communication device to the dongle; and j. formatting the vehicle diagnostic information received by the dongle for communication into the V2X data stream.

37. The method as recited in claim 36 wherein steps c.-j, proceed autonomously in response to engagement of the dongle to the vehicle diagnostic port.

* * * * *